(No Model.) 3 Sheets—Sheet 1.

E. F. STODDARD.
HORSE HAY RAKE.

No. 314,621. Patented Mar. 31, 1885.

Attest
Carl Spengel
E. W. Recton

Inventor
E. Forles Stoddard
by Steenis Peers Attys

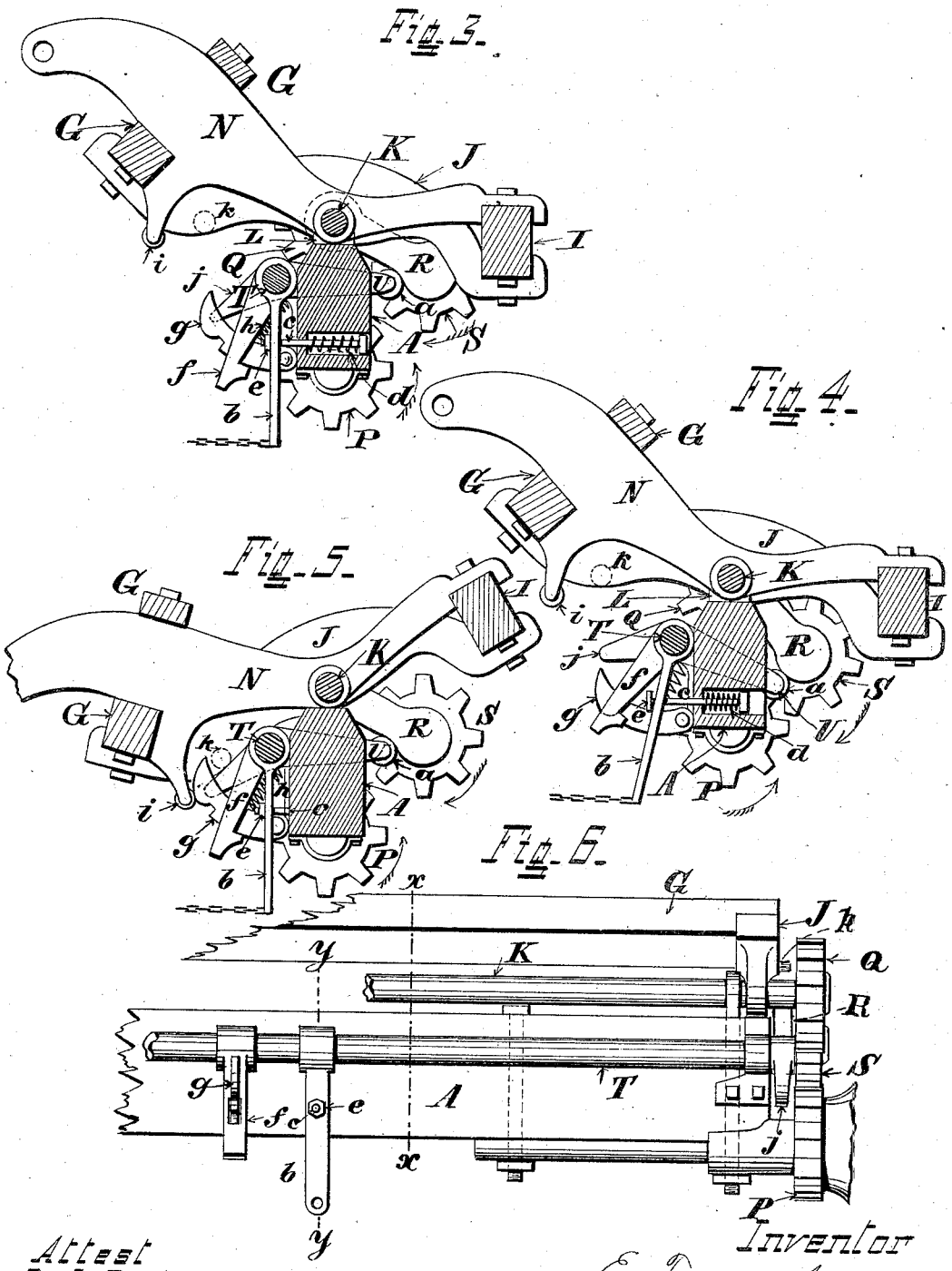

(No Model.)  E. F. STODDARD.  3 Sheets—Sheet 3.
HORSE HAY RAKE.

No. 314,621.  Patented Mar. 31, 1885.

WITNESSES
Chas. R. Burr
A. J. Stewart

INVENTOR
E. Fowler Stoddard
by Stem & Peck
his Attorneys

UNITED STATES PATENT OFFICE.

E. FOWLER STODDARD, OF DAYTON, OHIO, ASSIGNOR TO J. W. STODDARD & CO., OF SAME PLACE.

HORSE HAY-RAKE.

SPECIFICATION forming part of Letters Patent No. 314,621, dated March 31, 1885.

Application filed December 14, 1883. (No model.)

*To all whom it may concern:*

Be it known that I, E. FOWLER STODDARD, a citizen of the United States, residing at Dayton, in the county of Montgomery and State of Ohio, have invented certain new and useful Improvements in Horse Hay-Rakes, of which the following is a full, clear, and exact description, reference being had to the accompanying drawings, forming a part of this specification.

My invention relates to an improvement in horse hay-rakes of that class known as "self-dumpers," in which the traction of the machine is employed at the will of the operator to elevate the teeth and discharge the collected load, and this while the machine is either going forward in a straight line or is in the act of turning in either direction.

It also relates more particularly to that class of rakes which have been long and favorably known to the trade as "Hollingsworth" rakes, which are merely hand-dumping rakes, and are chiefly distinguished from other rakes by and derive their principal merit from having the teeth attached to a rocking frame consisting of two or more parallel bars supported upon arms pivoted to the axle, and with the teeth adjustably pivoted, so as to be capable of forward or backward adjustment to accommodate them to light or heavy raking, at a point between the bars of the rocking frame and in line with the oscillating axis of said rocking-frame. The most desirable manner of attaching the teeth in this class of rakes is by means of thimbles strung upon a rod or shaft just over the axle, which rod serves not only the purpose of a pivotal bearing for the teeth, but also for the arms of the rocking frame, which are mounted and journaled thereon.

The object of my present invention is, in addition to the functions of the rod or shaft above mentioned, to utilize the same by proper connections to transmit the power of either or both the carrying-wheels to a point of the rocking frame at or near its middle, so that the driver at pleasure can lock said shaft to the carrying-wheels, and thereby cause the tilting of the frame and consequent elevation of the teeth without rocking said frame, as might be the case if the power were applied at either end thereof.

The novelty of my invention will be herein described, and distinctly pointed out in the claims.

Figure 1:
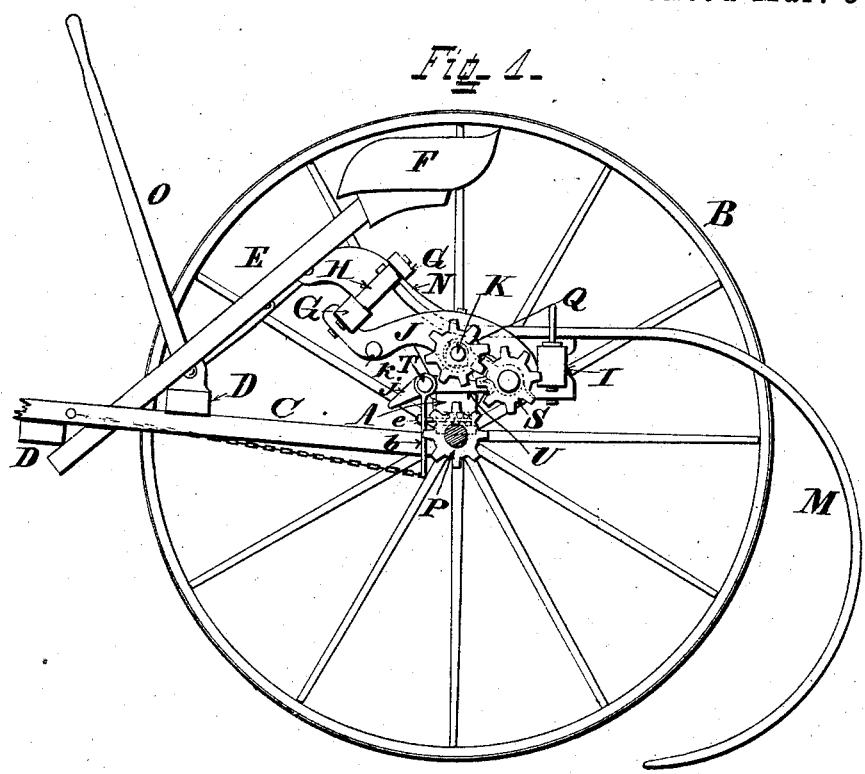
Figure 2:
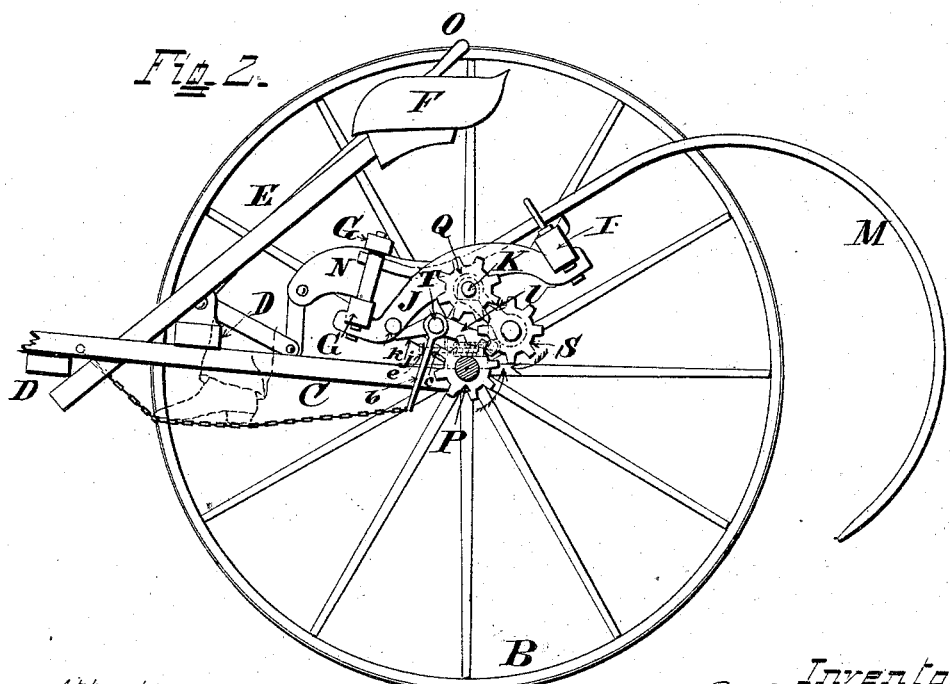
Figure 7:
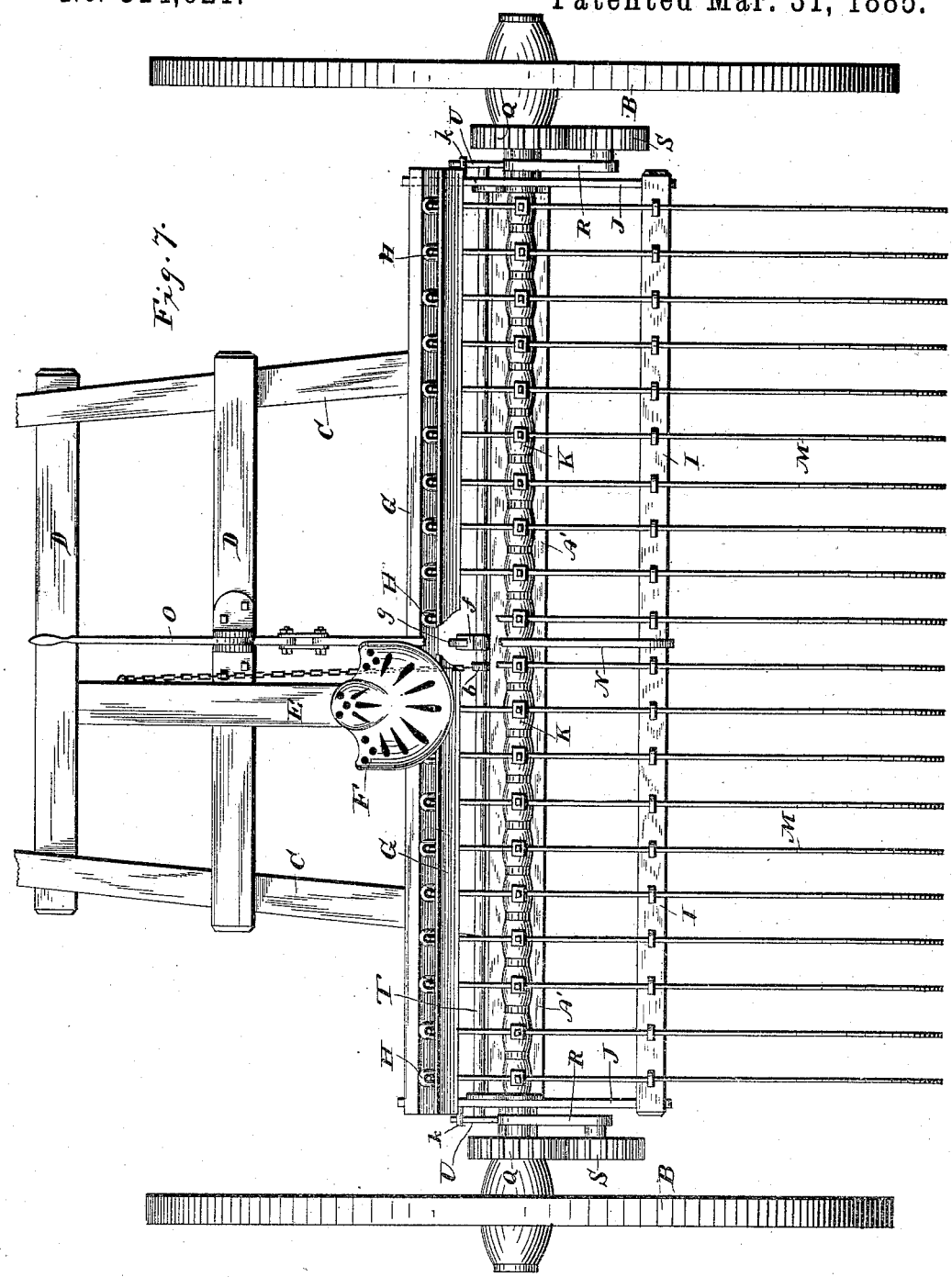

In the accompanying drawings, Figure 1 is a side elevation of a rake embodying my invention with the near carrying-wheel removed and the latch and detent omitted and with the teeth down at work. Fig. 2 is a corresponding view with the teeth elevated. Fig. 3 is an enlarged sectional view through the line *y y* of Fig. 6, showing the latch or detent and its connections in their positions when the teeth are down at work. Fig. 4 is a corresponding view showing the positions of the parts just as the lock has been effected. Fig. 5 is a corresponding view through the line *x x* of Fig. 6, showing the positions of the parts when the teeth are elevated and at the moment the lock has been broken. Fig. 6 is a front elevation of a little more than half of the axle, showing the relative position of the parts thereto attached. Fig. 7, Sheet 3, is a plan view of the machine, with a portion of the rake-head broken away.

The same letters of reference are used to indicate identical parts in all the figures.

A represents the axle, provided with spindles upon which the carrying-wheels B revolve. Secured to this axle are the customary thills, C, with cross-girts D, supporting the seat-beam E, to which is attached the driver's seat F.

The rocking frame or rake-head is composed, preferably, of two front bars, G, between which are secured the spring-supports H, for the forward ends of the rake-teeth, and a rear staple-bar, I, said bars being connected at their ends by the arms J, which are mounted at or about their middle upon a shaft or rod, K, carried in bearings above and extending the length of the axle.

The teeth M, of the shape shown, after being passed through the staples in the rear bar, are adjustably clamped in thimbles or eye-bearings, which are pivoted upon the shaft K in the usual or any suitable manner, and have their forward-projecting ends supported by the usual or any suitable spring-guides, H, connected to the front bar or bars of the rocker-frame.

At or about the middle of the rocker-frame is secured the lifting-arm N, which, attached to both the front and rear bars of the rocker-frame, encompasses, and is rigidly secured to, the shaft K by a key, pin, or other suitable fastening, and the usual hand-lever, O, Figs. 1 and 2, is connected to the forward end of the lifting-arm N.

This much of the rake constitutes the ordinary hand-dump rake of the Hollingsworth class.

Now to render this rake a self-dump rake, in which the power of either or both the carrying-wheels is applied to the rocking frame at or near its middle, I employ the following instrumentalities:

Attached to or formed with the inner ends of the hubs of the carrying-wheels are pinions P, which continually revolve with the carrying-wheels, and keyed or otherwise fastened to the ends of the shaft K, just outside of the arms J, are pinions Q, directly over the pinions P, but not meshing therewith.

Between the pinions Q and the arms J are loosely hung, preferably upon the shaft K, short arms R, to the outer and lower ends of which are journaled intermediate pinions, S, which mesh with the pinions Q at all times, but only with the pinions P when it is desired to dump the rake by the traction of the wheels.

Extending along the front of the axle, and secured in suitable bearings, is a rock-shaft, T, to the outer projecting ends of which are rigidly secured crank-arms U, which extend back under the arms R, and have, preferably, friction-rollers $a$ secured to their rear ends, which bear against the arms R.

Keyed or otherwise fastened to the rock-shaft T, preferably at or near its middle, is a pendent arm, $b$, from the lower end of which a chain, cord, or pedal mechanism extends, which is attached to the seat beam or frame within ready access of the driver's foot.

Through a perforation or slot in the arm $b$ is passed the front end of a bolt, $c$, which extends back through the axle, which is counter-bored from its rear side, as shown particularly in Figs. 3 and 4, to receive a spiral spring, $d$, which, encompassing the bolt, bears at its front against the front wall of the counter-bore, and at its rear against the head of the bolt, as shown. The tension of this spring may be adjusted by a nut, $e$, upon the front end of the bolt, bearing against the arm $b$, as will be readily understood.

The purpose of the spring-bolt just described is to hold the arm $b$ in such position that the arms U will hold up the arms R, and thereby keep the intermediate pinions, S, disengaged from the pinions P, as shown particularly in Figs. 1, 3, and 5, and also to retract the rock-shaft T and raise the pinions S when the lock has been broken. Also keyed upon the rock-shaft T is a downwardly-projecting slotted detent, $f$, directly under the lifting-arm N. Through the slot projects the forwardly-extending latch $g$, which is pivoted to the axle, as shown, has near its forward end a locking-notch on its under side, and is preferably forced down by any suitable spring, $h$, interposed between it and the axle. The end or nose of the latch may be beveled or rounded, as shown, and the arm N has an extension to which is preferably journaled a friction-roller, $i$, designed to come in contact with the nose of the latch and lift the same when the teeth have reached the desired point of elevation, and to aid, if need be, in forcing back the detent $f$, and by oscillating the rock-shaft T raise the arms U to disengage the pinions S and P. From this construction it will be readily understood that when the driver wishes to dump the rake he merely presses his foot upon the chain, thereby drawing forward the arm $b$ and oscillating the rock-shaft T, which, as it turns, throws forward the detent $f$ until the notch in the latch $g$ engages it, and thereby holds the rock-shaft T locked. This turning of the rock-shaft throws down the arm U and permits the arms R, with their attached pinions, to drop, so that said pinions S come into mesh with the pinions P. The parts are now in the position shown in Figs. 2 and 4, and the revolution of the pinions P is imparted, through the intermediate pinions, S, to the pinions Q and shaft K, and to the lifting-arm N at the middle of the rocking frame in such manner that the forward oscillation of the shaft K causes the rocking frame to be tilted and the teeth elevated. This tilting forward of the rocking frame or rake-head continues until the roller $i$ upon the arm N, or any other suitable striking device on said arm or rocking frame, comes in contact with and lifts the latch $g$, thereby freeing the detent and releasing the rock-shaft T, which, through the retraction of the spring $d$, acting upon the arm $b$, is so turned as to raise the arms U, which carry up the arms R, thereby lifting the intermediate pinions, S, out of gear with the pinions P. In case the spring $d$ should prove insufficient to turn back the rock-shaft T and effect the disengagement of the pinions S and P, the roller $i$ would come in contact with the detent $f$, and, forcing it back, would thus exert the tilting force of the rake-head directly upon the rock-shaft T to cause the raising of the arms U and disengagement of the pinions S and P, as will be readily understood. The position of the parts at this moment is shown in Fig. 5, and the rocking frame, being thus released, drops back with the teeth to a raking position.

It will be seen from this construction, and from the fact that the arms R are loosely pivoted, that, should the rake be in the act of turning in either direction, the self-dumping could take place just the same from the wheel traveling forward, while the intermediate pinion, S, next to the other wheel, would merely be thrown back, like a pawl escaping from a ratchet, without becoming locked, as will be readily understood; and it will furthermore be seen that the power of the carrying-wheels is exerted at or near the middle of the rocking frame, by which racking or straining of the frame is entirely obviated. Should the spring $d$ and the pressure of the roller $i$ upon the detent $f$ prove insufficient to turn the rock-shaft rod T to lift the arms U and effect the disengagement of the intermediate pinions, I provide forward extensions, $j$, to the arms U, so situated that lugs or detents $k$, upon the outer arms of the rocker-frame, would press upon the extensions $j$ just after the roller $i$ had released the latch $g$ and acted upon the detent $f$, so that any further forward tilting of the rocking frame would be thrown directly upon the extensions $j$ of the arms U, and cause them instantly to be thrown up in the rear to release the intermediate pinions and break the lock between the carrying-wheels and the rocking frame or rake-head. Furthermore, if desired, the arm $b$ and detent $f$ may be united in one piece, instead of being separate, as shown.

The rake herein described, while possessing some of the characteristics of the rake described in my application No. 114,519, filed on the same date herewith, differs essentially from that rake in that the shaft K is absolutely necessary in this case to transmit the power of the carrying-wheels to the rake-head, whereas in the case referred to the shaft K may be dispensed with.

Having thus fully described my invention, I claim—

1. In a horse hay-rake, the combination, with the forwardly and backwardly adjustable rake-teeth, the rake-head, and the carrying-wheels, of an oscillating non-rotating shaft upon which the teeth are pivoted and by means of which the rake-head is journaled concentric with the pivotal axes of the teeth, and connecting mechanism whereby said shaft can be locked to the carrying-wheels at the will of the operator to cause the tilting of the rake-head and elevation of the teeth as the rake advances or turns.

2. In a horse hay-rake, the combination, with the forwardly and backwardly adjustable rake-teeth, the rake-head, and the carrying-wheels provided with pinions, of an oscillating non-rotating shaft upon which the teeth are pivoted, and by means of which the rake-head is journaled concentric with the pivotal axes of the teeth, said shaft being rigidly fastened at or near its middle to the rake-head and having pinions fastened upon its ends, intermediate pinions, and connecting mechanism whereby said intermediate pinions can be made to engage with the pinions upon the carrying-wheels and thereby effect a lock between the rake-head and carrying-wheels at the will of the operator to cause the elevation of the teeth as the rake advances or turns.

3. In a horse hay-rake, the combination of a tilting rake-head, an oscillating non-rotating shaft upon which the teeth are pivoted and by means of which the rake-head is journaled concentric with the pivotal axes of the teeth, the carrying-wheels provided with pinions revolving therewith, and connecting and locking mechanism arranged to apply the lifting strain at or near the middle of the rake-head.

4. In a horse hay-rake, the combination of a vibrating rake-head, an oscillating non-rotating shaft attached rigidly to said rake-head and upon which the teeth are pivoted, and by means of which the rake-head is journaled concentric with the pivotal axes of the teeth, gearing connecting said shaft and the carrying-wheels at the will of the operator, mechanism for bringing said gearing into action and forming a lock between the carrying-wheels and rake-head, and a stop which, when the rake-head has been sufficiently elevated, disengages the gearing to permit the rake-head to fall back into raking position.

5. In a horse hay-rake, the combination of the rake-teeth, a rocking rake-head to which said teeth are attached, an oscillating non-rotating shaft upon which the teeth are pivoted and to which the rake-head is rigidly secured, and by means of which the rake-head is journaled concentric with the pivotal axes of the teeth, pinions keyed upon the ends of said shaft, intermediate pinions upon pivoted arms, pinions continuously revolving with and attached to the carrying-wheels, a rock-shaft upon the axle having secured thereto lifting-arms adapted to engage with the intermediate pinion-arms, and a latch or detent for holding said rock-shaft locked to cause the engagement of all the pinions and effect a lock between the rake head and carrying-wheels, and a stop upon the rake-head for breaking the lock between the latch and detent and disengaging the intermediate pinions from the carrying-wheel pinions, substantially as described.

6. In a horse hay-rake, the combination of the pinions P, the intermediate pinions, S, pinions Q, shaft K, the rake-head, the rock-shaft T, lifting-arms U, operating-arm $b$, detent $f$, and latch $g$, substantially as and for the purpose specified.

7. The combination of the rock-shaft T, provided with lifting-arms U, the operating-arm $b$, bolt $c$, spring $d$, latch $g$, and detent $f$, substantially as and for the purpose described.

8. In a horse hay-rake such as described, the combination, with the lifting-arms U, having forward extensions, $j$, of the lugs $k$ upon the rocking frame, substantially as and for the purpose described.

9. In a horse-rake such as described, the combination, with the rake-head and means for engaging it with the wheels, of the detent $f$, latch $g$, and a striking device $i$, for releasing said detent, substantially as described.

E. FOWLER STODDARD.

Witnesses:
QUINCY CORWIN,
H. A. CRANDALL.